Dec. 9, 1958      A. M. HOWARD      2,863,399
APPARATUS FOR HAULING VEHICLES
Filed Feb. 20, 1956      6 Sheets-Sheet 1

Dec. 9, 1958  A. M. HOWARD  2,863,399
APPARATUS FOR HAULING VEHICLES
Filed Feb. 20, 1956  6 Sheets-Sheet 2

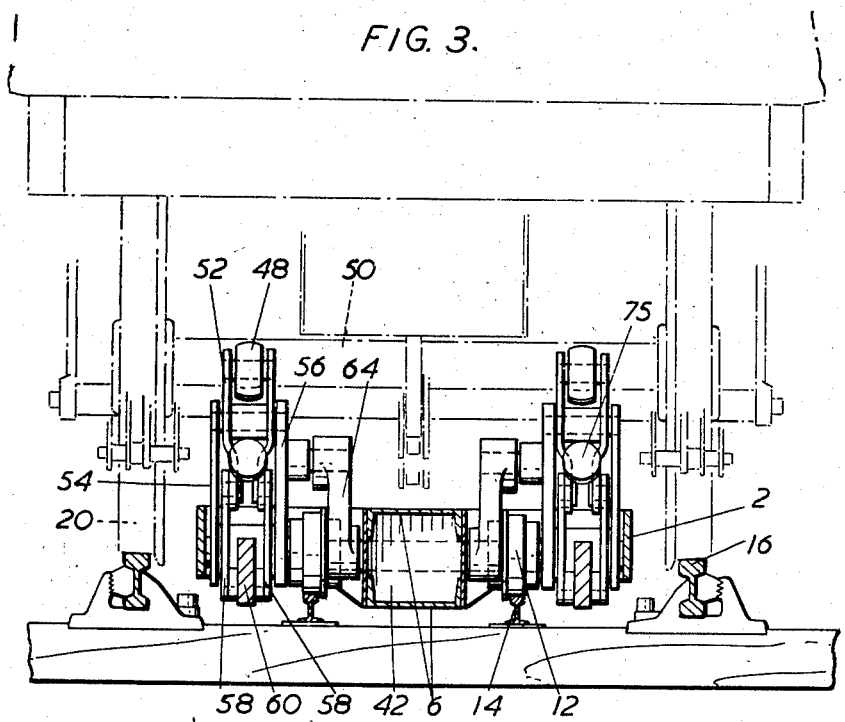
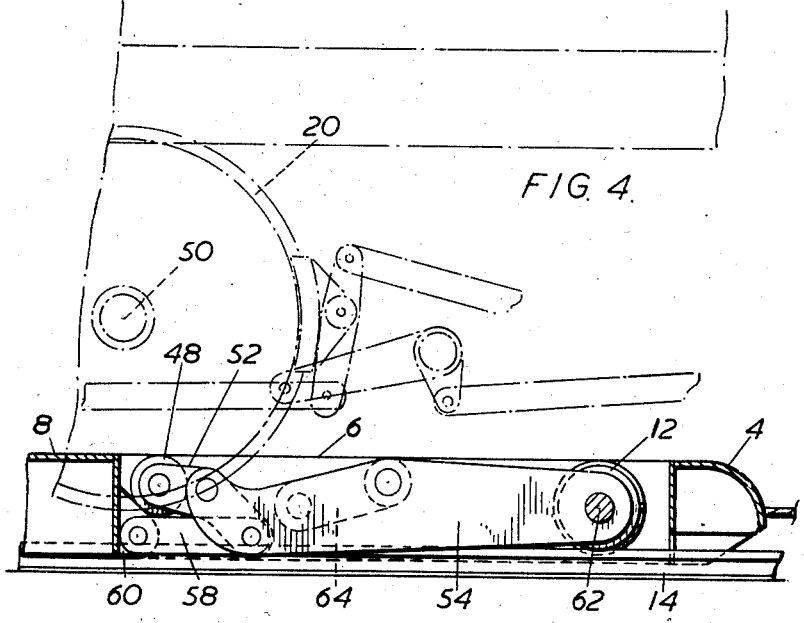

Dec. 9, 1958   A. M. HOWARD   2,863,399
APPARATUS FOR HAULING VEHICLES
Filed Feb. 20, 1956   6 Sheets-Sheet 4
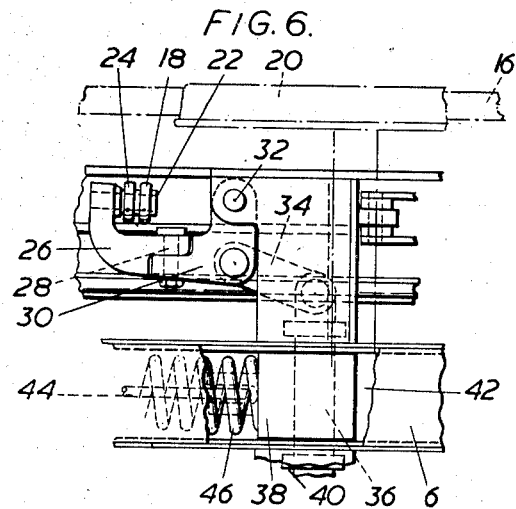
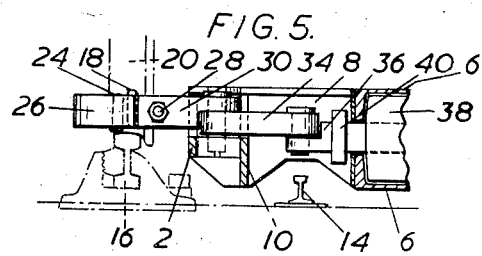
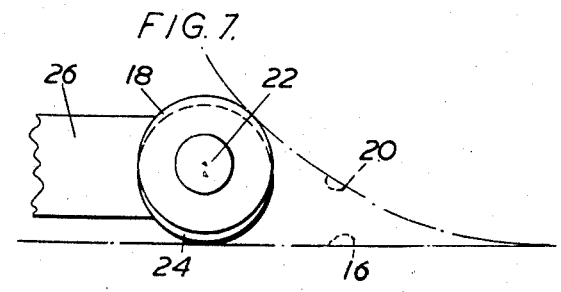

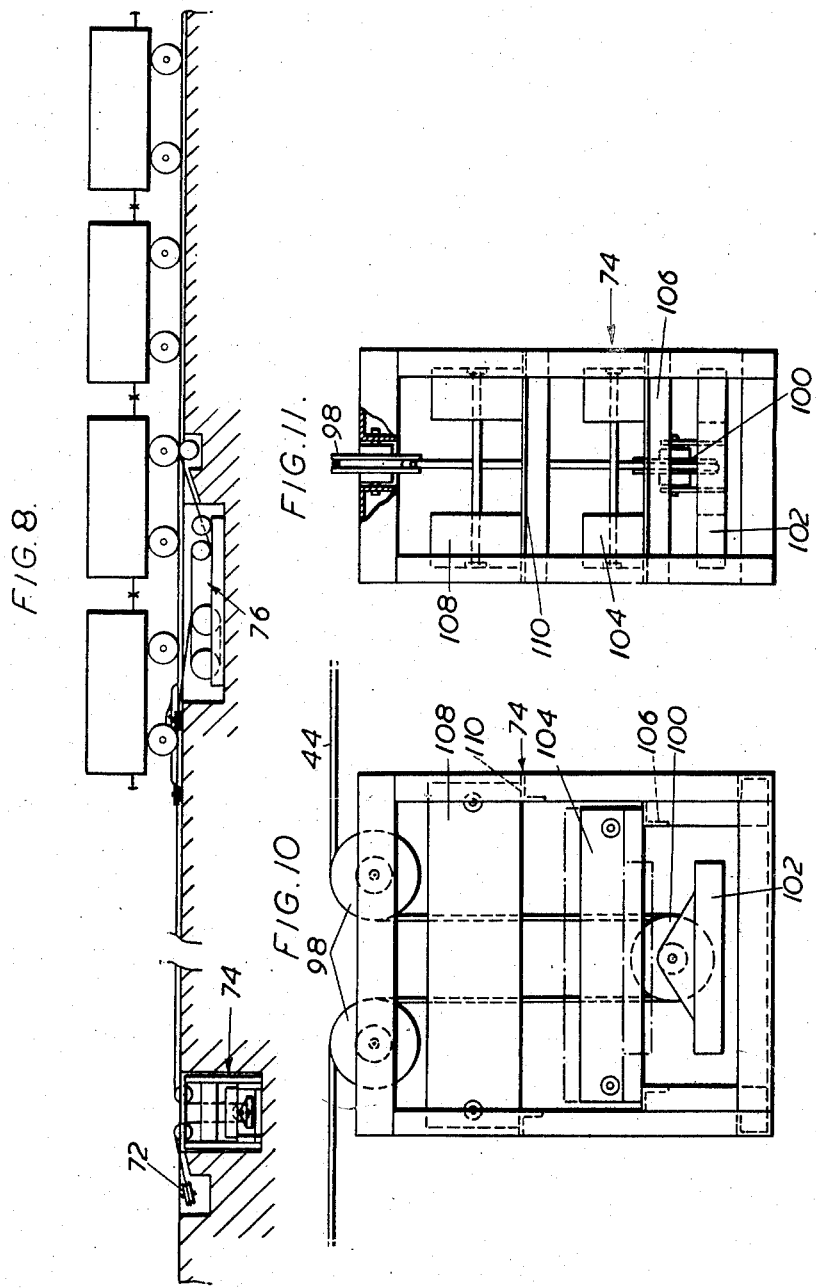

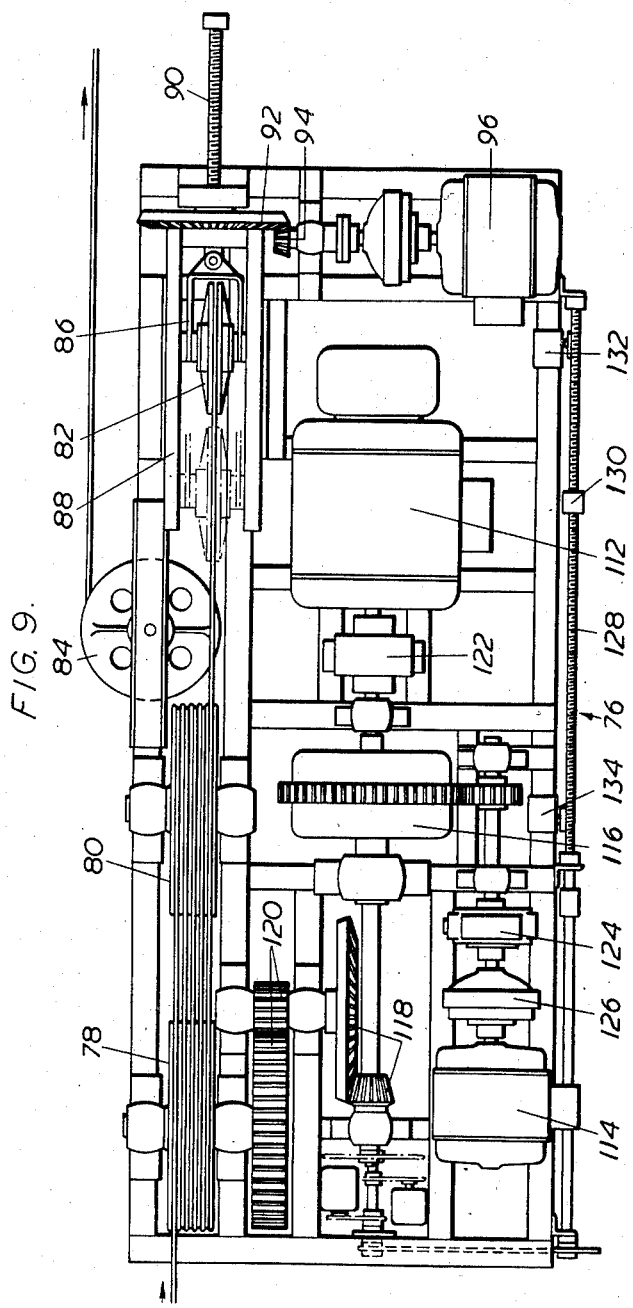

United States Patent Office
2,863,399
Patented Dec. 9, 1958

2,863,399

APPARATUS FOR HAULING VEHICLES

Allan Maurice Howard, Tipton, England, assignor to Nortons-Tividale Limited, Tipton, Staffordshire, England, a British company Application February 20, 1956, Serial No. 566,598

Claims priority, application Great Britain February 21, 1955

2 Claims. (Cl. 104—176)

In our application Ser. No. 368,640 we have described and claimed wagon haulage apparatus comprising a bogie which runs on a narrow track between rails for the wagons and which carries rollers movable between an inner position in which they will clear a wagon and an outer position in which they will engage the periphery of a wheel or wheels of a wagon close above the rails from behind and from in front so that the wagon can be moved backwards or forwards by movement of the bogie, characterised in that the rollers are movable outwards in succession so that first one or more rollers engage the wheel or wheels from one direction and thereafter a further roller or rollers engage the wheel or wheels from the opposite direction.

Now the height of the tops of the rollers above the rails for the wagons must be limited so that the rollers will clear brake shoes and links, allowance being made for depression of the wagon body when loaded and for wear of the tyres of the wheels. In practice, the rollers exert a greater vertical force than horizontal force. Thus, to avoid derailment of a wagon, the horizontal force must be limited to rather less than the fraction of the weight of the wagon falling on the particular wheels engaged by the rollers. If the wagon is empty but coupled to several loaded wagons, then the horizontal force may be less than is required to propel or retard the wagons.

In our application Serial No. 190,394, now Patent 2,767,662, we have described and claimed wagon haulage apparatus including particular mechanism for engaging the axle of a wagon from both directions. This mechanism cannot be readily used with wagons which have obstructions, such as brake gear and cross bars or hopper outlets, near or below the level of the axles, or both in front of and behind each axle.

In wagon haulage apparatus according to the present invention there are one or more rollers movable outwards from a bogie to engage one or more wheels of a wagon from one direction, and one or more rollers which are thereafter movable upwards from the bogie to engage one or more axles of the wagon from the opposite direction.

The bogie can be moved towards a wagon with the first roller or rollers outwards and with the second roller or rollers lowered, until the first roller or rollers engage the wagon wheels. Then the second roller or rollers can be raised to engage the wagon axle, despite the fact that there may then be obstructions both in front of and behind the second roller or rollers.

The second roller or rollers can apply a force not limited by the weight of a wagon. These rollers are arranged to engage from the direction from which the greatest force is required. Usually this will be for acceleration, but if the wagons are to travel downhill, the greatest force required may be for retardation.

The accompanying drawings show an example of apparatus according to the present invention. In these drawings:

Figures 2 and 3 are sections on the lines II—II and III—III in Figure 1;

Figure 4 is a fragmentary section similar to part of Figure 2 but showing the mechanism in a different position;

Figure 5 is a fragmentary section on the line V—V in Figure 1;

Figure 6 is a fragmentary plan similar to part of Figure 1 but showing the mechanism in a different position;

Figure 7 is a detail on a larger scale, seen from the direction of the arrow VII in Figure 1;

Figure 8 is a diagram of the complete apparatus;

Figure 9 is a plan of a rope control mechanism; and

Figures 10 and 11 are a side and an end elevation on a larger scale of a system of tensioning weights.

The apparatus is intended for hauling single wagons or short trains of wagons successively in the same direction as is required for example in coal-loading installations where wagons are to be loaded from an overhead hopper. In the figures the wagons are to move from right to left as seen in Figures 1, 2, 4, 6 and 8.

Figure 1:
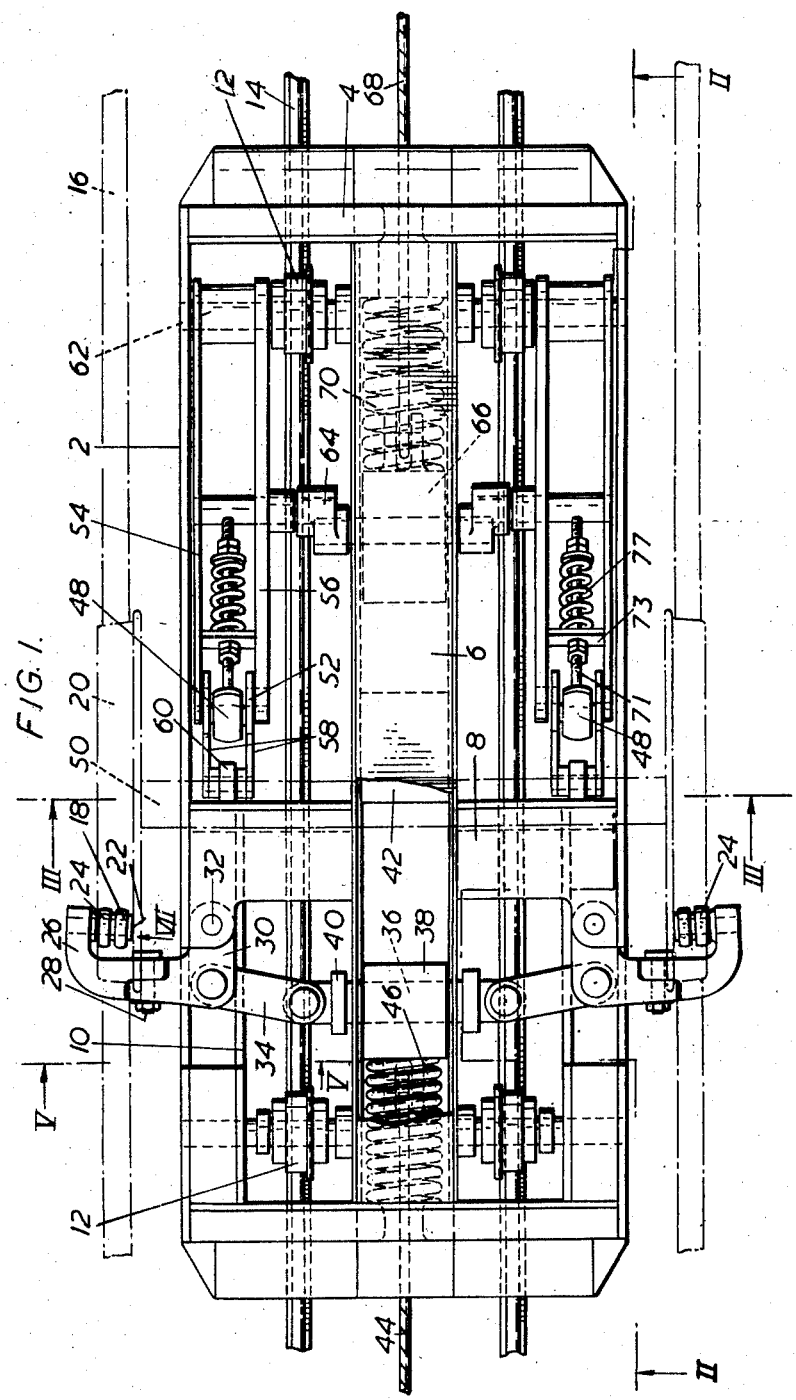
Figure 1 is a plan of the bogie.

The bogie, which is shown in detail in Figures 1 to 7, has a rectangular frame made up of side members 2, end members 4, a pair of longitudinal channels 6, cross members 8, and inner side members 10. The bogie has wheels 12 which run on the rails 14 of a narrow gauge track laid between the main rails 16 which carry the wheels 20 of the wagons. The bogie carries a pair of rollers 18 which in their outer position, as shown in Figures 1, 5 and 7, serve to engage the front of the leading wheels 20 of a wagon. The rollers 18 are on pins 22 which also carry rollers 24 offset downwards from the rollers 18. The rollers 24 engage the rails 16 and so rotate in the opposite direction to the rollers 18. The pins are carried by brackets 26 which are hinged at 28 with slight freedom of movement to levers 30. The provision of the hinges 28 and rollers 24 ensures that the substantial vertical components of any forces between the wheels 20 and the rollers 18 are resisted by the rails 16 and not by the levers 30.

The levers 30 are pivoted to the bogie at 32 and are connected by pivoted links 34 to a bar 36 which can slide through a crosshead 38 to an extent limited by collars 40. This sliding movement occurs if the axle of a wagon is not truly at right angles to the rails. The crosshead 38 slides in a guide constituted by the longitudinal channels 6, and is controlled by a stop 42, a length of rope 44 and a compression spring 46. When the tension in the length 44 is large, the mechanism assumes the position shown in Figures 1, 5 and 7, with the rollers 18 in their outer position to engage the wheels 20 as already described. When the tension in the length 44 is small, the mechanism assumes the position shown in Figure 6, with the rollers 18 in their inner position so that they can pass clear beneath a wagon.

Figure 2:
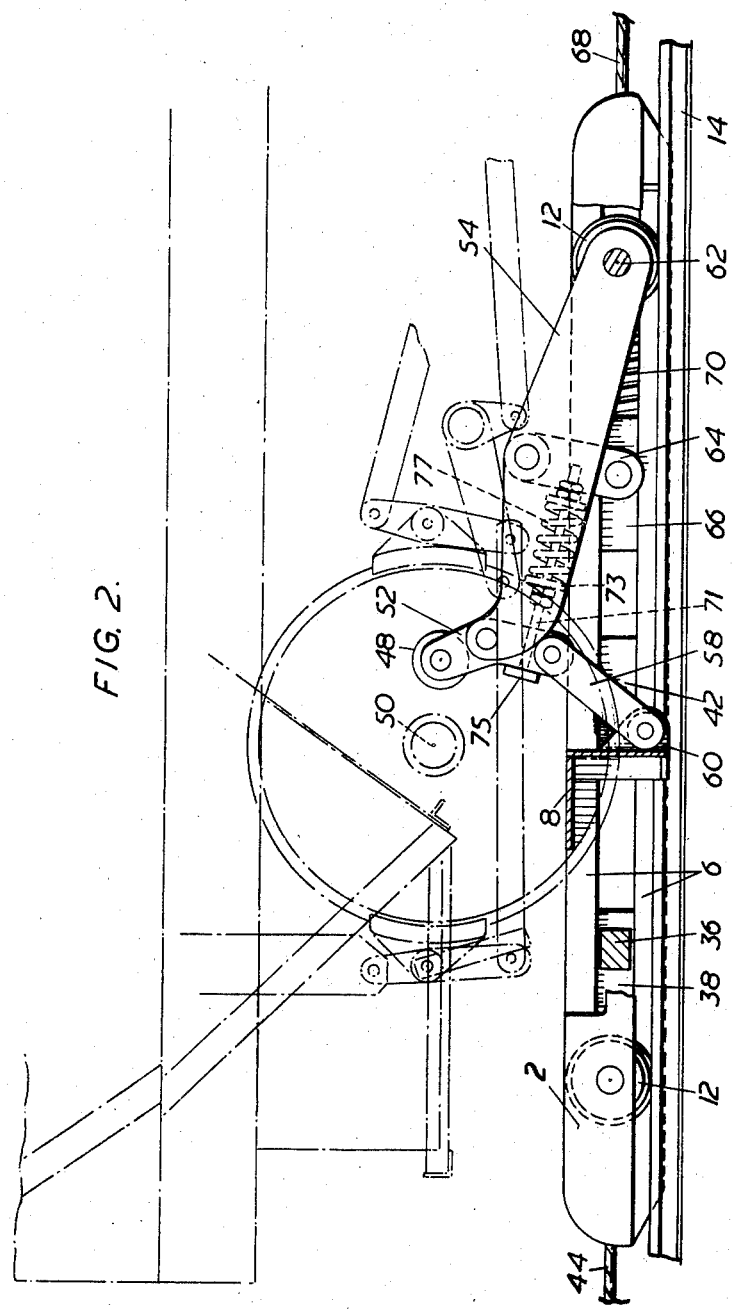

The bogie also carries a pair of rollers 48 which in their upper position, as shown in Figures 1, 2 and 3, serve to engage the rear of the leading axle 50 of the wagon. The rollers 48 engage the axle at points fairly close within the wheels 20 so that the axle is only subjected to a small bending moment. The rollers 48 are mounted in forks 52 which are pivoted between pairs of arms 54 and 56, and are also connected by links 58 to pivots 60 on the cross members 8. The arms 54 and 56 are pivoted on a bogie axle 62, and the arms 56 are connected by pivoted links 64 to a second crosshead 66. This second crosshead also slides between the longitudinal channels 6 and is controlled by the stop 42, a second length of rope 68 and a second compression spring 70. When the tension in the length 68 is large, the mechanism assumes the position shown in Figures 1, 2 and 3, with the rollers 48 in their upper position to engage the axle 50 as already described. When the tension in the length 68 is small, the mechanism assumes the position shown in Figure 4, with the rollers 48 in a lower position so that they can pass clear beneath a wagon. The spring 70 is considerably stronger than the spring 46. The rollers 48 each have a buffer in the form of a rod 71 which passes through the lower part of the forks 52 and through a cross piece 73 between the arms 54 and 56. When the rollers are raised, a head 75 on one end of the rod engages the fork, and a spring 77 is compressed between the other end of the rod and the cross piece 73. These buffers absorb shocks and permit both rollers 48 to engage the axle 50 if it is not truly at right angles to the rails.

The two lengths 44 and 68 of rope are in fact opposite ends of the same rope which is led from the front of the bogie round a return pulley 72, as shown in Figure 8, then through a device 74 which includes a system of tensioning weights, then through a control mechanism 76 and finally round a return pulley, not shown, and so back to the bogie. The rope is supported at intervals along its length by the pulleys usual in rope haulage systems. In the control mechanism 76, as shown in Figure 9, the rope is led repeatedly round a driving drum 78 and an idle drum 80 and is also led round pulleys 82 and 84. The pulley 82 is mounted in a frame 86 which can slide to and fro in guides 88 under the control of a screw 90 co-operating with the threaded bore of a bevel gear 92. The bevel gear can be driven through a co-operating gear 94 by an electric motor 96 so as to move the pulley 82 to and fro. The effect of movement of the pulley 82 is, in conjunction with the device 74, to alter the tension in the length of rope 44 to any of three substantially different values. In the device 74 the length of rope 44 passes over guide pulleys 98 and also round a suspended pulley 100 which carries a weight in the form of a flat plate 102. As the pulley 82 is moved from left to right in Figure 9 so the pulley 100 is raised, and in rising the plate 102 first picks up a weight 104 which has been resting on ledges 106 and then picks up a further weight 108 which has been resting on ledges 110. In this way the tension in the length of rope 44 is increased in two definite stages. These increases are large compared with the differences in tension in the lengths 44 and 68 which are necessary to haul the bogie. The device 74 may be arranged to act on the rope 68 instead of on the rope 44.

When the pulley 82 is in an extreme left-hand position and the pulley 100 is at the bottom of its travel, then tension in the lengths of rope is low, both springs 46 and 70 are expanded and the rollers 18 and 48 are clear of a wagon. When the pulley 82 is moved to an intermediate position then the plate 102 picks up the weight 104. As a result the tension in the length of rope 44 increases sufficiently to compress the spring 46 and move the rollers 18 into their outer position. The tension in the length of rope 68 (which as is explained above will differ from the tension in the rope 44 only by the amount induced by the haulage mechanism) is not, however, sufficient to compress the spring 70. When the pulley 82 is moved to its extreme right-hand position then the plate 102 picks up the weight 108 in addition to the weight 104, and the tension in the lengths of rope is further increased, so that the spring 70 is then compressed and the rollers 48 are moved to their upper position.

The driving dum 78 can be driven alternatively by a motor 112 and a motor 114. The two motors both drive the same differential gear 116 which is connected to the drum 78 through bevel gearing 118 and spur gearing 120. The motor 112 is provided with a brake 122 and the motor 114 with a brake 124 so that when the brake 122 is applied the drum can be driven by the motor 114 and when the brake 124 is applied the drum can be driven by the motor 112. In addition a fluid coupling 126 is interposed between the motor 114 and the brake 124. The drive from the differential gear to the drum also drives a long screwed shaft 128 carrying a nut 130. Alternatively this shaft may be driven from any other suitable element on the winch. The travel of this nut is proportional to the travel of the bogie and the nut serves to operate limit switches 132 and 134 which prevent the bogie over-running its track.

The operation of the apparatus will be described starting from a position in which the bogie is clear of one train of wagons and is about to return to pick up a fresh train. The pulley 82 is moved to its intermediate position so that the rollers 18 are in their outer position and the bogie is then hauled rearwards by the motor 114. When the rollers 18 encounter the front of the wheels of the leading axle of the next train of wagons the fluid coupling 126 is unable to transmit sufficient force to move the wagons and accordingly the bogie comes to rest. The motor 114 is then switched off and the brake 124 is applied. The pulley 82 is moved to its right-hand position so that the rollers 48 engage the rear of the leading axle of the train of wagons. The brake 122 is released and the bogie is then hauled forwards by the motor 112, drawing the wagons with it. The driving force is transmitted by the rollers 48. It will be noticed that the linkage between each pair of rollers and its crosshead has a toggle action so that pressure on the rollers when in their outer position has little or no tendency to displace the crosshead. If at any point it is desired to slow down the wagons or to control them on a slight downward slope then force is transmitted by the rollers 18. It is also possible to reverse the motor 112 and drive the wagons backwards if desired, but the force transmissible by the rollers 18 is limited in proportion to the weight on the axle 50, while the force transmissible by the rollers 48 is not subject to this limitation. When the wagons have reached their destination the motor 112 is stopped, the brake 122 is applied, and the pulley 82 is moved to its left-hand position. Accordingly the rollers 18 and 48 are moved to their inner position and lower position respectively so that the bogie can travel freely beneath the train of wagons. The brake 124 is released and the motor 114 is used to drive the bogie backwards towards the next train of wagons. Before the bogie reaches this next train the pulley 82 is returned to its intermediate position so that the rollers 18 are moved to their outer position.

Throughout operation the bogie and its mechanism remains clear of all hoppers and brake gear of a wagon such as are indicated in broken outlines in Figures 1 and 3.

The use of ropes both for hauling a bogie and for controlling mechanism for engaging a wagon is the subject of our application Serial No. 190,394.

I claim:

1. A wagon haulage apparatus comprising a bogie adapted to run on a narrow track between rails for wagons, said bogie including wagon wheel and axle engaging means, a first linkage means including a first pivoted arm connecting said wheel engaging means to said bogie to move said wheel engaging means laterally outwardly of the bogie to engage a wheel of a wagon on one side only of the point of engagement of the wheel with the track therefor, a second linkage means including a second pivoted arm connecting said axle engaging means to said bogie to move said axle engaging means vertically of the bogie to engage an axle of the wagon on the side of said axle opposite to the side on which the wheel is engaged with said wheel engaging means, said first and second linkage means being spaced longitudinally of the bogie and movable independently of one another, said wheel and axle engaging means being connected to said first and second arms respectively and said arms mounted on said bogie for pivotal movement between inoperative positions wherein the wheel and axle engaging means clears the wheel and axle respectively of the wagon and operative positions wherein the wheel and axle engaging means engage the wheel and axle respectively of the wagon, first control means slidably mounted in said bogie and connected to said first linkage means for normally maintaining said wheel engaging means in an inner inoperative position and adapted to be shifted longitudinally of said bogie to move said wheel engaging means to the outer operative position thereof, second control means slidably mounted in said bogie and connected to said second linkage means for normally maintaining said axle engaging means in a lower inoperative position and adapted to be shifted longitudinally of said bogie to move said axle engaging means to the upper operative position thereof, said second control means being movable independently of said first control means, a pull member connected to said first and second control means and means connected with said pull member for tensioning said pull member for moving said wheel engaging means to the outer position and subsequently moving said axle engaging means to the upper position thereof.

2. A wagon haulage apparatus according to claim 1 in which said wheel and axle engaging means comprise pairs of rollers and said axle engaging rollers engage the axle at points adjacent to the wheels.

References Cited in the file of this patent

UNITED STATES PATENTS

| | | |
|---|---|---|
| 1,125,110 | Jones | Jan. 19, 1915 |
| 1,125,283 | Fickinger | Jan. 19, 1915 |
| 1,162,760 | Fickinger | Dec. 7, 1915 |
| 1,478,676 | Richey | Dec. 25, 1923 |
| 1,484,086 | Rutherford | Feb. 19, 1924 |
| 1,573,388 | Friesen | Feb. 16, 1926 |
| 1,886,588 | Riblet | Nov. 8, 1932 |
| 2,405,920 | Winston | Aug. 13, 1946 |
| 2,481,421 | Hayes | Sept. 6, 1949 |
| 2,767,662 | Howard et al. | Oct. 23, 1956 |

FOREIGN PATENTS

| | | |
|---|---|---|
| 358,956 | Germany | Sept. 18, 1922 |
| 518,799 | Germany | Mar. 4, 1931 |
| 613,694 | Germany | May 27, 1935 |
| 706,517 | Great Britain | Mar. 31, 1954 |
| 101,908 | Sweden | July 1, 1941 |